United States Patent [19]
Salam et al.

[11] Patent Number: 5,305,250
[45] Date of Patent: Apr. 19, 1994

[54] ANALOG CONTINUOUS-TIME MOS VECTOR MULTIPLIER CIRCUIT AND A PROGRAMMABLE MOS REALIZATION FOR FEEDBACK NEURAL NETWORKS

[75] Inventors: Fathi M. A. Salam, Okemos, Mich.; Mohammed I. El-Naggar, Columbus, Ohio

[73] Assignee: Board of Trustees operating Michigan State University, East Lansing, Mich.

[21] Appl. No.: 348,309

[22] Filed: May 5, 1989

[51] Int. Cl.$^5$ .................. G06G 7/12; G06G 7/163
[52] U.S. Cl. .................... 364/807; 307/201; 307/497; 364/841; 395/24
[58] Field of Search ............ 307/201, 497, 529; 328/160; 364/807, 841, 513; 395/24

[56] References Cited

U.S. PATENT DOCUMENTS

| | | | |
|---|---|---|---|
| 3,987,293 | 10/1976 | Crooke et al. | 364/825 |
| 4,101,966 | 7/1978 | Uzunoglu | 328/160 X |
| 4,710,726 | 12/1987 | Czarnul | 328/127 X |
| 4,903,226 | 2/1990 | Tsividis | 364/807 |
| 4,931,674 | 6/1990 | Kub et al. | 307/497 X |
| 4,950,917 | 8/1990 | Holler et al. | 307/201 |

FOREIGN PATENT DOCUMENTS 1280401 12/1986 U.S.S.R. ............... 364/841

OTHER PUBLICATIONS

Bibyk, S. et al., "Issues in Analog VLSI and MOS Techniques for Neural Computing", in *Analog VLSI Implementation of Neural Systems*, ed. C. Mead et al., Klawer, 1989, pp. 103-133.

N. Khachhab et al., Proceedings of IEEE International Symposium on Circuits and Systems, May 1987, pp. 762-765.

M. Ismail et al., IEEE Journal of Solid State Circuits, vol. 23, No. 1, Feb. 1988, pp. 183-194.

M. Ismail, Electronics Letters, vol. 23, No. 20, Sep. 24, 1987, pp. 1099-1100.

J. J. Hopfield et al., IEEE Trans. on Circuits and Systems, vol. CAS-33, No. 5, May 1986, pp. 533-541.

H. P. Graf et al., AIP Neural Networks for Computing, pp. 182-187, 1986.

M. Sivilotti et al., Chapel Hill Conference on VLSI, pp. 329-342, 1985.

P. Horowitz et al., *The Art of Electronics*, Cambridge University Press, 1989, pp. 118-122.

P. Wasserman et al., "Neural Networks, Part 2: What are they and why is everybody so interested in them now?", *IEEE Expert*, Spring 1988, pp. 10-15.

Primary Examiner—Stephen M. Baker
Attorney, Agent, or Firm—Ian C. McLeod

[57] ABSTRACT

A neuron circuit and a neural network including a four quadrant analog multiplier/summer circuit constructed in field effect transistors. The neuron circuit includes the analog multiplier/summer formed of an operational amplifier, plural sets of four field effect transistors, an RC circuit and a double inverter. The multiplier/summer circuit includes a set of four identical field effect transistors for each product implemented. This produces a four quadrant multiplication if the four field effect transistors operate in the triode mode. The output of the multiplier/summer is the sum of these products. The neural network includes a plurality of these neuron circuits. Each neuron circuit receives an input and a set of synaptic weight inputs. The output of each neuron circuit is supplied to the corresponding feedback input of each neuron circuit. The multiplier/summer of each neuron circuit produces the sum of the product of each neuron circuit output and its corresponding synaptic weight. The individual neuron circuits and the neural network can be constructed in MOS VLSI.

5 Claims, 3 Drawing Sheets

ANALOG CONTINUOUS-TIME MOS VECTOR MULTIPLIER CIRCUIT AND A PROGRAMMABLE MOS REALIZATION FOR FEEDBACK NEURAL NETWORKS

TECHNICAL FIELD OF THE INVENTION

The technical field of the invention is the field of neural networks and particularly feedback neural networks analogous to the Hopfield type.

BACKGROUND OF THE INVENTION

Neural networks represent an alterative approach to information processing than the serial algorithmic computers of the type envisioned by John von Neumann. In a computer of the von Neumann type a single processing device executes an explicit program in a step-by-step serial fashion. Many information processing problems can be solved by this approach, as witnessed by the recent explosive rise in the number of computers and in the number of applications susceptible to computer processing.

There are limitations to type of information processing which can be performed by a computer based on the von Neumann model. Before such a computer can be employed to perform an information processing function, a person must understand the nature of the problem to be solved and produce an explicit program of instructions to solve this problem according to an algorithm. An algorithm is a mechanistic or recursive procedure for the solution of a problem. The existence of such an algorithm is a necessary condition for information processing employing a computer based on the von Neumann model. In addition, it is further necessary that a person translate that alogorithm into the explicit program required by the particular computer.

There are numerous important information processing tasks which are difficult or impossible to perform using von Neumann type computers. In some cases algorithms have not yet been developed for these information processing tasks. In other cases it may be impossible to develop an algorithm of the type required by von Neumann type computers. Information processing tasks of this type include pattern recognition, understanding continuous speech, identifying handwritten characters, and identifying objects having varying orientations.

Problems of this type are of the sort that people can do well while current computers do poorly or not at all. Neural networks are attempts to exploit the supposed organization of the human brain to attack these problems. Neural networks are collections of many individual computing elements called neurons. These neurons are coupled together in complex networks in which any single neuron receives input from many other neurons. The coupling from any neuron to another neuron many be strong or weak.

There are two methods commonly employed in selection of these internal representation of the network. In the most general of neural networks a feedback learning process is employed to change the strength of connection between neurons and to change the transfer function of each neuron to accommodate the particular information processing task at hand. Usually this is done by presenting inputs to the neural network and the corresponding desired outputs, and allowing the network to determine the proper internal representation for generating the desired output from the input. An important class of neural networks, including those constructed according to the Hopfield model, do not yet incorporate this dynamic learning process but require preselected connection strengths. This permits the construction of large networks by simplifying the construction of individual neuron circuits and their connections. However, this advantage in construction is offset by the requirement that the connection strengths corresponding to a set of desired stored vectors be determined.

Hopfield has proposed a neural circuit model in, e.g. "Simple Neural Optimization Networks: an A/D converter, a signal decision circuit, and a linear programming circuit", by J. J. Hopfield and D. W. Tank, *IEEE Transactions on Circuits and Systems*, vol. CAS-33, No. 5, May 1986, pages 533–541. Neurons are modeled as processing input/output devices. The synaptic weight $T_{ij}$ describes the extent to which the input of the i-th neuron is driven by the output of the j-th neuron. A positive value of $T_{ij}$ indicates that the j-th neuron excites the i-th neuron. A negative value of $T_{ij}$ indicates that the j-th neuron inhibits the i-th neuron. This proposed system implements the neurons as operational amplifiers connected by linear resistors or conductances. The operational amplifiers realize the input/output relation. When $T_{ij}$ is greater than 0, a normal operational amplifier is employed. When $T_{ij}$ is less than 0, then an inverting operational amplifier is used. The linear resistors or conductances realize the absolute values of the synaptic weights $T_{ij}$. The Hopfield model generally does not include self-feedback for each neuron circuit in which a portion of the output of each neuron circuit is feedback to its input. Such a network will settle to one of a limited number of steady state equilibria for each given set of inputs, synaptic weights and self-feedback weights (if employed).

A practical neural network needs to be programmable. That is, the synaptic weights $T_{ij}$ and the self-feedback weights should be alterable by the user. This enables the neural network to be applicable to differing problems. Changing the synaptic weights and the self-feedback weights alters the location and number of the steady state equilibria of the network. The Hopfield model achieves this alterability using variable linear resistances for the synaptic weights.

Typical neural networks include many individual neuron circuits. Practical uses of neural networks often require hundreds or thousands of neuron circuits. If information processing using neural networks is to achieve wide use, the construction of neural networks must be adapted to permit large number of neuron circuits to be employed. This implies an accommodation between the model of individual neuron circuits and their connectivity and circuits that are readily and abundantly realizable in hardware. Due to the large size of such neural networks, it would be particularly advantageous to construct neural networks in an integrated circuit technology which is relatively inexpensive, such as analog metal oxide semiconductor very large scale integration (analog MOS VLSI).

There are some obstacles in VLSI implementation of neural networks including: 1) the necessary dense connectivity between neuron circuits; 2) the requirement that the linear resistive element from output j to input i ($T_{ji}$) be equal to the linear resistive element from output i to input j ($T_{ij}$); and 3) the problem of implementing variable linear resistive elements in silicon. The first problem is not different from existing challenges in VLSI designs and can be dealt with using standard and evolving techniques. It is known that the equality of the symmetric linear resistive elements is a necessary condition to ensure convergence of all solutions to equilibria only. It is also known that small imperfections generally preserve the convergence to equilibria but may introduce dynamic (non-equilibria) steady states such as oscillations. Thus this requirement is a problem that may be possible to endure. The last obstacle, that of implementing variable linear resistance elements in silicon, appears to be the major obstacle to constructing the existing continuous-time models of artificial neural networks in analog VLSI; in particular, dynamic feedback neural networks of the Hopfield type.

There have been several proposed approaches to the problem of implementing neural networks in MOS VLSI. Firstly, the programmability of the network can be traded for simplicity of implementation. This can be achieved using fixed resistive elements to provide the weights between the neurons as proposed in "VLSI Implementation of a Neural Network Memory with Several Hundreds of Neurons", by H. P. Graf, L. D. Jackel, R. E. Howard, B. Straughn, J. S. Denker, W. Hubbard, D. M. Tennant and D. Schwartz, *AIP Neural Networks for Computing*, pages 182 to 187, 1986. Secondly, the neural weight can be restricted to $+1$, $-1$ or 0 and implemented in pass transistors and switches. This was proposed in "A Novel Associative Memory Implemented Using Collective Computation", by M. Sivilotti, M. Emerling and C. Mead, 1985 *Chapel Hill Conference on VLSI*, pages 329 to 342, 1985. Other proposed designs modify the weights but do not retain the qualitative dynamic properties from an analytic point of view.

SUMMARY OF THE INVENTION

The present invention is a neuron circuit and a neural network including a four quadrant analog multiplier/summer circuit constructed in MOS field effect transistors. The four quadrant multiplier/summer is a generalization of the four quadrant multiplier proposed in "Novel Continuous-Time All-MOS Four Quadrant Multipliers" by N. Khachhab and M. Ismail, *Proceedings of IEEE Internaltinal Symposium on Circuits and Systems*, May 1987, pages 762–765, hence forth referred to as the Khachhab-Ismail multiplier circuit. The multiplier/summer circuit provides an output voltage proportional to a voltage sum of products. The multiplier/summer circuit performs a vector or scalar product. Each term in the sum is the product of a neural feedback input voltage and a synaptic weight input voltage.

The neural circuit includes the analog multiplier/summer, an RC circuit and a double inverter. The multiplier/summer circuit is formed of an operational amplifier having inverting and noninverting inputs and plural field effect transistors. A first resistance having a predetermined resistance value is connected between the inverting input and the output of the operational amplifier. A second resistance having the same resistance value is connected between the noninverting input of the operational amplifier and ground. In order to obtain an all-MOS implementation suitable for large scale integration, the first and second resistances are replaced by four resistance field effect transistors according to the double-MOSFET method discribed in "A New MOSFET-C Universal Filter Structure for VLSI" by M. ISmail, S. Smith and R. Beale, *IEEE Journal of Solid State Circuits*, vol. 23, no. 1, February 1988, pages 183–194.

A set of four field effect transistors, identical in construction, is required for each multiplication implemented. A first field effect transistor has its source-drain path connected between the corresponding first synaptic weight input voltage and the inverting input of said operational amplifier. The gate is grounded. The second field effect transistor has its source-drain path connected between the negative of the corresponding synaptic weight input voltage and the inverting input of said operational amplifier. Its gate is connected to the corresponding feedback input voltage. As will be discussed below, this feedback input is the output of another neuron circuit. The third field effect transistor has its source-drain path connected between the negative of the corresponding synaptic weight input voltage and the noninverting input of said operational amplifier. The gate of this third field effect transistor is grounded. The fourth field effect transistor has its source-drain path connected between the corresponding synaptic weight voltage and the noninverting input of said operational amplifier. The gate of this fourth field effect transistor is connected to the corresponding feedback input voltage.

This multiplier circuit produces a four quadrant multiplication if the four field effect transistors operate in the triode mode. The circuit can perform more than one multiplication, and sum the products, by provision of an additional set of four field effect transistors for each desired product.

The neural network includes a plurality of these neuron circuits. Each neuron circuit receives a set of inputs and a corresponding set of synaptic weight inputs. The output of each neuron circuit is supplied to the corresponding feedback input of each neuron circuit. The multiplier/summer produces the sum of the product of each neuron circuit output and its corresponding synaptic weight. The individual neuron circuits and the neural network can be constructed in MOS VLSI.

The circuit can also be employed in a differential mode to form the sum of one or more products, each product being the multiplication of difference between a first differential voltage and a second differential voltage and the difference between a third differential voltage and a fourth differential voltage. This embodiment is similar to the previous embodiment of the circuit except for the connection of the four multiplication field effect transistors. In the differential mode embodiment, the first multiplication field effect transistor has its source-drain path connected between the corresponding first differential voltage and the inverting input of the operational amplifier, and its gate connected to the fourth differential voltage. The second multiplication field effect transistor has its source-drain path connected between the corresponding second differential voltage and the inverting input of the operational amplifier, and its gate connected to the corresponding third differential voltage. The third multiplication field effect transistor has its source-drain path connected between the corresponding second differential voltage and the noninverting input of the operational amplifier, and its gate connected to the fourth differential voltage. Lastly, the fourth multiplication field effect transistor has its source-drain path connected between the corresponding first differential voltage and the noninverting input of the operational amplifier, and its gate connected to the corresponding third differential voltage. The triode operation condition is similar for this differential mode as for the previous embodiment.

BRIEF DESCRIPTION OF THE DRAWINGS

These and other objects and aspects of the present invention will become clear from the following description of the invention taken in conjunction with the Figures, in which.

DETAILED DESCRIPTION OF THE PREFERRED EMBODIMENT

Figure 2:
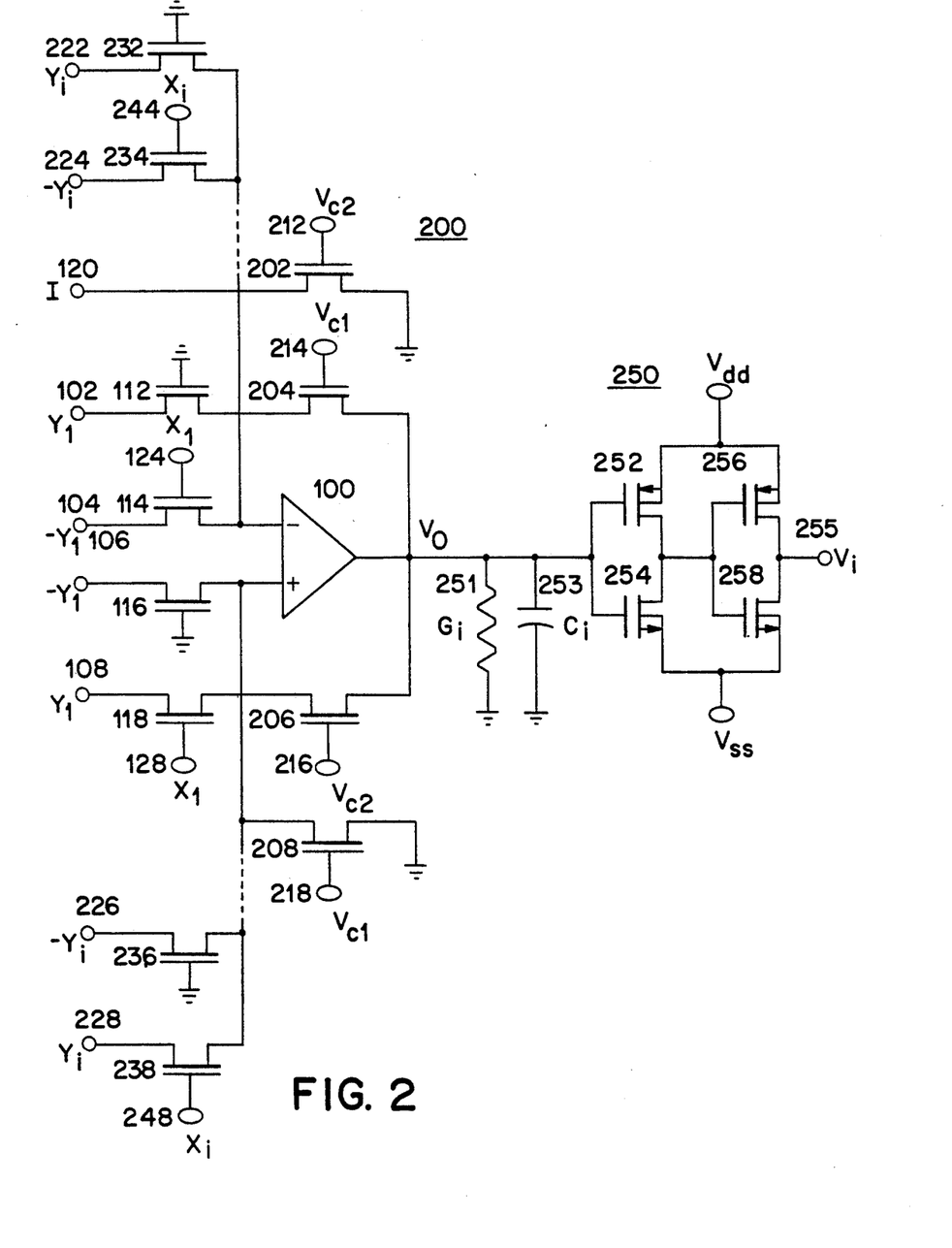
FIG. 2 illustrates an analog continuous-time MOS vector multiplier neuron circuit in accordance with the preferred embodiment of the present invention.
Figure 3:
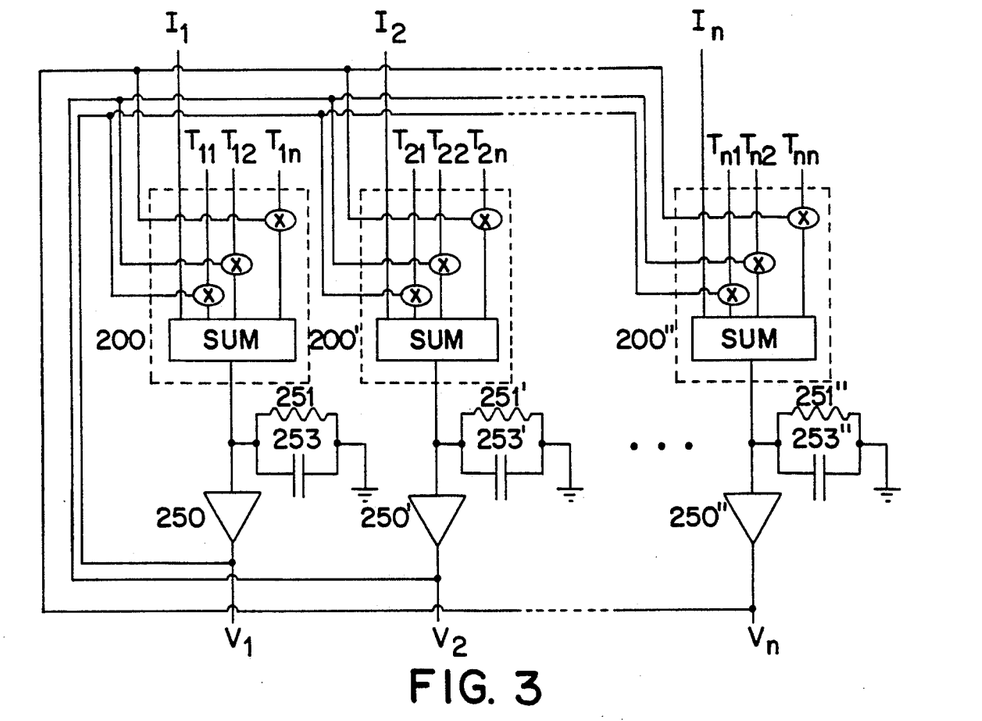
FIG. 3 illustrates an example of a neural network employing the neuron circuits of the present invention.

The objectives of the present invention are achieved through the use of a four quadrant multiplier/summer circuit implemented in MOS. The theory of operation of this circuit will be explained in conjunction with FIG. 1. FIG. 2 illustrates a practical neuron circuit which can be embodied in MOS VLSI. FIG. 3 illustrates the use of a plurality of the neuron circuits of this invention in a neural network.

Figure 1:
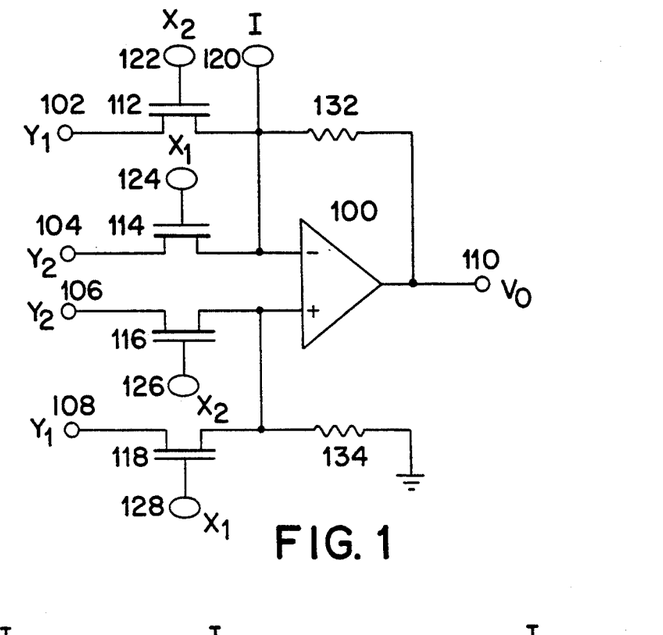
FIG. 1 illustrates a circuit useful in understanding the operation of the present invention.

FIG. 1 is the simple Khachhab-Ismail operational amplifier four quadrant multiplier circuit which is used to illustrate the principle of operation of the four quadrant multiplier/summer of the present application. Operational amplifier 100 includes a noninverting input, an inverting input and an output. The output of operational amplifier 100 supplies the output of the circuit at output terminal 110. The input to operational amplifier 100 includes: input terminal 120; field effect transistors 112 and 114 coupled by their sources to the inverting input; and field effect transistors 116 and 118 connected by their sources to the noninverting input. Those skilled in the art would realize that the sources and drains of field effect transistors 112, 114, 116 and 118 can be made interchangeable by connecting the substrates to the most negative voltage level. Input terminal 120 receives an independent input current I. Field effect transistors 112, 114, 116 and 118 have their sources connected to input terminals 102, 104, 106 and 108, respectively, and their gates connected to input terminals 122, 124, 126 and 128, respectively. Negative feedback to operational amplifier 100 is provided by resistor 132, which is connected between the output and the inverting input of operational amplifier 100. Resistor 134 has the same resistance as resistor 132 and is connected between the noninverting input of operational amplifier 100 and ground.

The four field effect transistors 112, 114, 116 and 118 are all constructed identically. Assume that: the voltage $Y_1$ is applied to both input terminals 102 and 108; the voltage $Y_2$ is applied to terminals 104 and 106; the voltage $X_1$ is applied to both input terminals 124 and 128; and the voltage $X_2$ is applied to both input terminals 122 and 126. Let us also assume that each of the field effect transistors 112, 114, 116 and 118 is of the N-channel depletion type and operates in the triode mode. Thus the current I through each field effect transistor from the drain to the source is given by:

$$I = \mu C_{ox}(W/L)[(v_g - v_s - v_t)(v_d - v_s) - \tfrac{1}{2}(v_d - v_s)^2]$$

where $\mu$ is the carrier mobility, $C_{ox}$ is the capacitance per unit area of the oxide, W/L is the ratio of the gate width W to the gate length L of each of the field effect transistors 112, 114, 116 and 118, $v_g$ is the gate voltage, $v_s$ is the source voltage, $v_d$ is the drain voltage, all these voltages measured with reference to ground, and $v_t$ is the threshold voltage. Because the four field effect transistors 112, 114, 116 and 118 are identical, we can set the quantity $\mu C_{ox}(W/L)$ equal to K for each device.

The transfer function of the Khachab-Ismail multiplier circuit illustrated in FIG. 1 can be determined from known principles regarding such circuits. Firstly, the voltage $V_O$ at the output terminal 110 is driven by the high gain of operational amplifier 100 in order to make the voltage at the inverting input nearly equal to the voltage at the noninverting input. The voltage at the inverting input of operational amplifier 100 is:

$$V_{In} = V_O + I_{rl}R$$

where $I_{rl}$ is the current flowing through resistor 132 from the inverting input to the output terminal 115, and R is the resistance of resistor 132. The voltage at the noninverting input of operational amplifier 100 is:

$$V_N = I_{r2}R$$

where $I_{r2}$ is the current flowing through resistor 134 from the noninverting input to ground, and R is the resistance of resistor 134, which is the same as that of resistor 132. Thus we find:

$$V_O = I_{r2}R - I_{r1}R = R(I_{r2} - I_{r1})$$

Because the inverting and noninverting inputs of operational amplifier 100 have high impedance, they do not sink or source current. Thus from Kirchoff's Current Law applied at the inverting input of operational amplifier 100, the current $I_{r1}$ through resistor 132 is the sum of the input current I, the current $I_1$ through field effect transistor 112 and the current $I_2$ through field effect transistor 114. Likewise from Kirchoff's Current Law applied at the noninverting input of operational amplifier 100, the current $I_{r2}$ through resistor 134 is the sum of the current $I_3$ through field effect transistor 116 and the current $I_4$ through field effect transistor 118. Thus:

$$V_O = R[(I_3 + I_4) - (I + I_1 + I_2)]$$
$$= R[(I_3 - I_1) + (I_4 - I_2) - I]$$

From the above relationship for the current through a field effect transistor in triode mode and the input voltage definitions, the fact that the four field effect transistors are identical and thus have the same $v_t$, and remembering that the inverting and noninverting inputs to operational amplifier 100 have the same voltage and thus the source voltage $v_s$ of each of the field effect transistors is the same, we have:

$$I_1 = K[(X_2-v_s-v_t)(Y_1-v_s) - \tfrac{1}{2}(Y_1-v_s)^2]$$

$$I_2 = K[(X_1-v_s-v_t)(Y_2-v_s) - \tfrac{1}{2}(Y_2-v_s)^2]$$

$$I_3 = K[(X_2-v_s-v_t)(Y_2-v_s) - \tfrac{1}{2}(Y_2-v_s)^2]$$

$$I_4 = K[(X_1-v_s-v_t)(Y_1-v_s) - \tfrac{1}{2}(Y_1-v_s)^2]$$

Thus:

$$V_O = R[(I_3-I_1)+(I_4-I_2)-I]$$

$$\begin{aligned}V_O &= KR\,[((X_2-v_s-v_t)(Y_2-v_s) - \tfrac{1}{2}(Y_2-v_s)^2 \\ &\quad - (X_1-v_s-v_t)(Y_2-v_s) - \tfrac{1}{2}(Y_2-v_s)^2) \\ &\quad + ((X_1-v_s-v_t)(Y_1-v_s) - \tfrac{1}{2}(Y_1-v_s)^2 \\ &\quad - (X_2-v_s-v_t)(Y_1-v_s) - \tfrac{1}{2}(Y_1-v_s)^2)] - IR \\ &= KR\,[(X_2-X_1)(Y_2-v_s) + (X_1-X_2)(Y_1-v_s)] - RI \\ &= KR(X_2-X_1)(Y_2-Y_1) - IR\end{aligned}$$

This may also be written as:

$$V_O = KR(X_1-X_2)(Y_1-Y_2) - IR$$

Note that the condition that each of field effect transistors 112, 114, 116 and 118 operate in the triode mode requires that:

$$Y_1, Y_2 \leq \min[(X_1-v_t), (X_2-v_t)]$$

The above analysis uses a simple second-order model for the field effect transistor in the triode region. It has been shown in the original Khachab-Ismail multiplier description and also in "Four-Transistor Continuous-Time MOS Transconductor" by M. Ismail, *Electronics Letters* vol. 23, no. 20, Sept. 26, 1987, pages 1099–1100, that if the more accurate strong inversion model of the field effect transistors is used in this analysis that the same results are obtained.

A four quadrant multiplier/summer can be achieved by setting $Y_2 = -Y_1$ and $X_2 = 0$. The output of the operational amplifier circuit $V_O$ thus becomes:

$$V_O = 2KRX_1Y_1 - IR$$

If $X_1$ is positive then the triode operation condition becomes $$Y_1 \leq \min[(X_1-v_t), -v_t]$$

or $$|Y_1| \leq -v_t$$

Similarly, if $X_1$ is negative the triode operation condition becomes:

$$|Y_1| \leq X_1 - v_t$$

Note that these conditions imply a greater operational range in positive $X_1$ than in negative $X_1$. It is therefore advantageous to operate the neural circuit so that $X_1$ is always non-negative.

Note that a four quadrant multiplier can be achieved by other selections of input conditions. For example, other useful choices include setting $X_2 = 0$ and $Y_1 = 0$, or setting $X_2 = 0$ and $Y_1 = 0$, or other combinations of inputs for one X term and one Y term. Each of these selections enables positive or negative synaptic weights to be implemented with only positive voltages.

FIG. 2 illustrates a practical embodiment of an analog continuous-time MOS vector multiplier neuron circuit including a generalized version of the Khachab-Ismail four quadrant multiplier. This generalized version will be referred to as the multiplier/summer. FIG. 2 illustrates multiplier/summer 200, resistor 251, capacitor 253 and double inverter 250.

In multiplier/summer 200 resistors 132 and 134 are realized by the four of field effect transistors 202, 204, 206 and 208. Field effect transistors 202, 204, 206 and 208 are constructed of identical depletion or enhancement field effect devices. Assume that the voltage $V_{c1}$ is applied to input terminals 214 and 218 and that the voltage $V_{c2}$ is applied to the input terminals 212 and 216. From Kirchoff's Current Law applied to the respective inverting and noninverting inputs of operational amplifier 100 we have:

$$I+I_1+I_2 = I_{a1}+I_{a2}$$

$$I_3+I_4 = I_{b1}+I_{b2}$$

where $I_{a1}$ is the current through field effect transistor 202, $I_{a2}$ is the current through field effect transistor 204, $I_{b1}$ is the current through field effect transistor 208 and $I_{b2}$ is the current through field effect transistor 206. If we subtract the first of these equations from the second, we have:

$$-(I_{a1}-I_{b1})-(I_{a2}-I_{b2}) = (I_3+I_4)-(I+I_1+I_2)$$

If the field effect transistors 202, 204, 206 and 208 are operating in the triode region, and assuming that the inverting and noninverting input voltages are the same and equal to $v_d$, then:

$$I_{a1} = K_r[(V_{c2}-0-v_t)v_d - \tfrac{1}{2}(v_d)^2]$$

$$I_{a2} = K_r[(V_{c1}-V_0-v_t)(v_d-V_0) - \tfrac{1}{2}(v_d-V_0)^2]$$

$$I_{b1} = K_r[(V_{c1}-0-v_t)v_d - \tfrac{1}{2}(v_d)^2]$$

$$I_{b2} = K_r[(V_{c2}-V_0-v_t)(v_d-V_0) - \tfrac{1}{2}(v_d-V_0)^2]$$

with $K_r$ equal to $\mu C_{ox}(W/L)_r$ for the field effect transistors 202, 204, 206 and 208. Substituting this into the current expression and using the previous computations for the currents $I_1$, $I_2$, $I_3$ and $I_4$ yields:

$$V_O = \frac{2KX_1Y_1 - I}{K_r(V_{c1}-V_{c2})}$$

Assuming that the carrier mobility and the capacitance per unit area of the oxide are the same for the field resistance effect transistors 202, 204, 206 and 208 as for the field effect transistors 112, 114, 116 and 118, a reasonable assumption if these devices are all formed on the same MOS VLSI circuit, and thus the field effect transistors 202, 204, 206 and 208 differ from the field effect transistors 112, 114, 116 and 118 only in the aspect ratio (W/L), then:

$$V_O = \frac{(W/L)}{(W/L)_r}\left[\frac{2X_1Y_1}{(V_{c1}-V_{c2})}\right] - \frac{I}{K_r(V_{c1}-V_{c2})}$$

Thus the equivalent resistor value R is thus given by:

$$R = \frac{1}{K_r(V_{c1} - V_{c2})}$$

In order for the resistance field effect transistors 202, 204, 206 and 208 to operate in the triode mode, we must have:

$$V_O \leq \min[(V_{c1} - v_t), (V_{c2} - v_t)]$$

FIG. 2 illustrates the use of plural sets of four field effect transistors. Each set of four field effect transistors can perform a multiplication. The operational amplifier 100 forms the sum of these plural products. The circuit illustrated in FIG. 2 thus forms a vector product.

FIG. 2 illustrates the use of an additional set of four field effect transistors 232, 234, 236 and 238, which can perform an additional multiplication. Note that the voltage $X_i$ is applied to input terminals 244 and 248, the voltage $Y_i$ is applied to input terminals 222 and 228 and the voltage $-Y_i$ is applied to the input terminals 224 and 226. The set of four field effect transistors 232, 234, 236 and 238 are connected to operational amplifier 100 in the same manner as field effect transistors 112, 114, 116 and 118 with the differing inputs $X_i$ and $Y_i$. It should be understood that another set of four field effect transistors can likewise be connected to operational amplifier 100 to form the multiple of another set of input voltages $X_j$ and $Y_j$. Assuming there are n such sets of four field effect transistors, an analysis similar to that above indicates that output $V_O$ is given by:

$$V_O = \frac{-I + 2(K_1 X_1 Y_1 + K_2 X_2 Y_2 + \ldots + K_n X_n Y_n)}{[K_r(V_{c1} - V_{c2})]}$$

where $K_i$ is $\mu C_{ox}(W/L)_i$ for the i-th set of four field effect transistors. Assuming identical field effect transistors except for the gate width to length ratio (W/L), then:

$$V_O = \frac{-I}{K_r(V_{c1} - V_{c2})} + \frac{2}{[(W/L)_r(V_{c1} - V_{c2})]} \sum_{i=1}^{n} (W/L)_i X_i Y_i$$

with $(W/L)_i$ being the gate width to gate length ratio for the i-th set of four field effect transistors. This result is of the same form as the desired neural network scalar product V for each neuron, given by:

$$V = -I' + \sum_{i=1}^{n} X_i Y_i'$$

where $X_i$ acts as the output of the i-th neuron circuit, $Y_i'$ is an assignable weight value and $I'$ is an external biasing. This result requires that all the field effect transistors operate in the triode region. From the analysis above we note that for depletion type field effect transistors this means:

$|Y_i| \leq -v_t$ if $X_i$ is positive, $|Y_i| \leq X_i - v_t$ if $X_i$ is negative, and $V_O \leq \min[(V_{c1} - v_t), (V_{c2} - v_t)]$ FIG. 2 further illustrates a double inverter 250 connected to the output of operational amplifier 100. Resistor 251 represents the parasitic input impedance of double inverter 250. Capacitor 253 represents the parasitic input capacitance of double inverter 250. As illustrated in FIG. 2, double inverter 250 consists of a first CMOS inverter of field effect transistors 252 and 254 in tandem with a second CMOS inverter of field effect transistors 256 and 258. Double inverter 250 implements the sigmoidal function of the neuron circuit. It also serves to isolate the operational amplifier 100 from the neuron circuit output at output terminal 255 and further serves to provide a greater fan out capability. Due to the presence of operational amplifier 100, realization of a neuron circuit via a CMOS double inverter is appropriate even for networks with a very large number of neuron circuits.

The provision of double inverter 250 is one of convenience only. It is feasible to omit double inverter 250 and permit operational amplifier 100 to produce the neuron circuit output. This is possible because the output of each neuron circuit is fed back to the gates of field effect transistors of other neuron circuits. As detailed below, this choice of connections is deliberate because it permits the neuron circuit outputs to be applied to the virtually infinite input impedance of the field effect transistor gates. Thus the operational amplifier 100 alone may drive a large number of feedback inputs.

FIG. 3 illustrates the formation of a neural network in accordance with the Hopfield model employing the neuron circuit just described in conjunction with FIG. 2. Each neuron circuit is constructed in accordance with FIG. 2, including: the multiplier/summer 200 (200' or 200''); the RC circuit consisting of resistor 251 (251' or 251'') and capacitor 252 (253' or 253''); and double inverter 250 (250' or 250''). The i-th neuron circuit receives: an input $I_i$; a plurality of synaptic weight inputs $T_{i1}$, $T_{i2}$, $T_{i3}$ ... $T_{in}$; and feedback from each of the neuron circuit outputs $V_1$, $V_2$, $V_3$ ... $V_n$. Note that this connection assumes self-feedback of the neuron circuit output $V_i$ weighted by the synaptic weight input $T_{ii}$.

The exact connections of the synaptic weight inputs and the feedback inputs are not illustrated in FIG. 3. The input $I_i$ is applied to the inverting input of the operational amplifier 100 in the manner illustrated in FIGS. 1 and 2. It is contemplated that the synaptic weight inputs $T_{ij}$ be applied to the multiplier/summer 200 as the $Y_i$ inputs (with appropriate scaling for the proportionality constant $K_i/[K_r(V_{c1} - V_{c2})]$) and that the feedback of the neuron circuit outputs $V_i$ be applied as the $X_i$ inputs. This applies the independently specified synaptic weights to the source-drain path of the field effect transistors. Though not illustrated in FIG. 3, this choice of implementation of the multiplier requires that the negative of each synaptic weight input $(-T_{ij})$ also be applied to the multiplier/summer 200. This process is easier to accomplish with the independently set synaptic weights than with the neuron circuit output feedback. Employing this technique enables the neuron circuit outputs $V_j$ to be applied to the gates of two field effect transistors. When there are n total neuron circuits in the network, each neuron circuit produces an output $V_i$ governed by the equations:

$$C_i \dot{V}_O + G_i V_O = -I_i' + \sum_{j=1}^{n} T_{ij} V_j$$

-continued $$V_i = S_i(V_O)$$

where $C_i$ corresponds to the capacitance of capacitor 253, $G_i$ corresponds to the conductance of resistor 251, $V_o$ is the output of multiplier/summer circuit 200, and $S_i$ represents the sigmoidal input/output function of double inverter 250.

This neuron circuit and neural network are advantageous over prior Hopfield model neural networks for several reasons. The provision of a four quadrant multiplier/summer eliminates the need to provide special circuits for negative synaptic weights. Typically, prior circuits required the production of both a normal and an inverse output from each neuron circuit, the latter needed to enable negative synaptic weights with realizable positive resistances or conductances. Thus there were two output drivers and two sets of output lines which needed to be routed to the other neuron circuits. This required the use of large amounts of integrated circuit area, thereby limiting the number of neuron circuits that could be placed on a single integrated circuit. The present invention requires the routing of only a single output from each neuron circuit to the input of the neuron circuits, thus freeing area that can be used for useful circuits rather than interconnections. The present design also reduces the area needed for the double inverter circuits for each neuron circuit. Because the field effect transistor gates of the multiplier/summer circuits 200 have virtually infinite input impedance, there is no restriction on the fan out capacity of even modest size double inverters 250. Thus many more neuron circuits can incorporated in a single integrated circuit in the present design than in the prior art.

Figure 4:
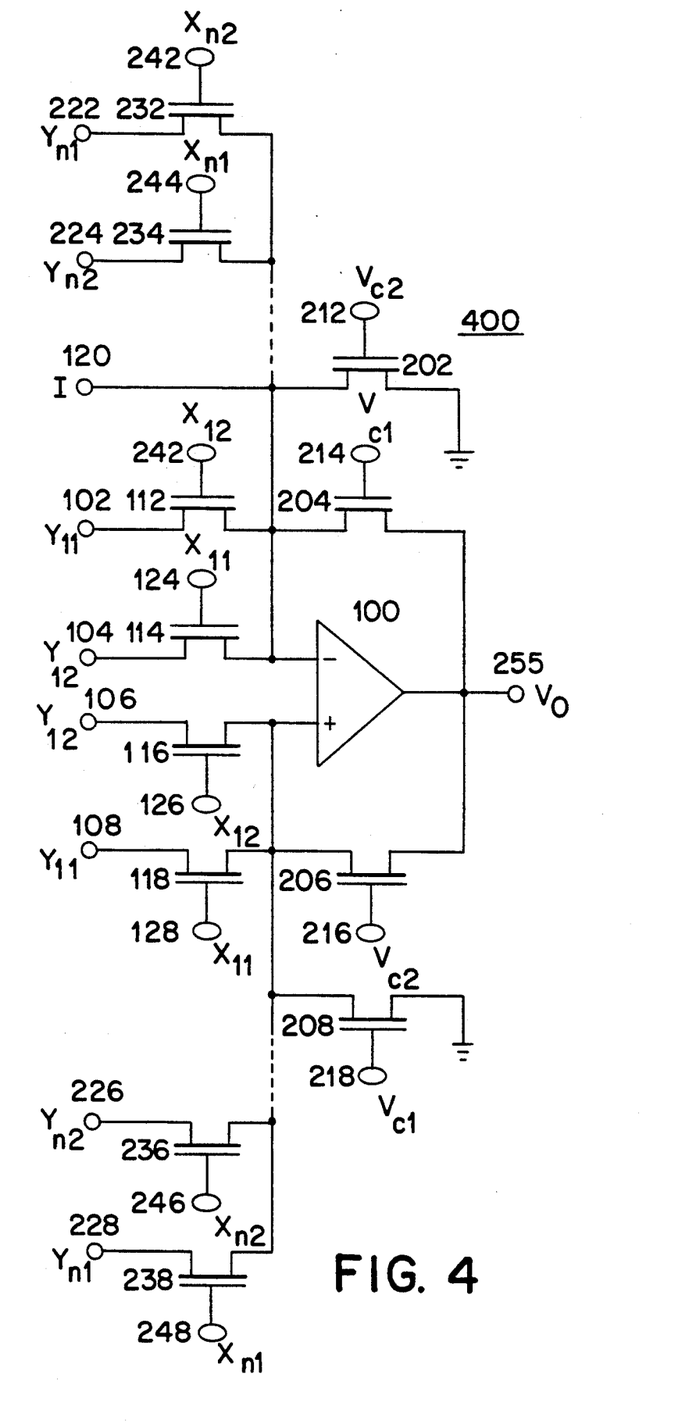
FIG. 4 illustrates an analog continuous-time MOS vector multiplier neuron circuit in accordance with an alternative embodiment of the present invention.

FIG. 4 illustrates multiplier/summer circuit 400, which is an alternative embodiment of the multiplier/summer circuit 200 illustrated in FIG. 2. In this alternative embodiment each multiplication is the product of two differences. This alternative embodiment has differing connections to the four field effect transistors forming each product than that previously illustrated in FIG. 2. FIG. 4 illustrates that field effect transistor 112 has its source-drain path between $Y_{11}$ and the inverting input of operational amplifier 100. The gate of field effect transistor 112 receives the signal $X_{12}$. Field effect transistor 114 has its source-drain path connected between $Y_{12}$ and the inverting input of operational amplifier 100, with its gate connected to $X_{11}$. Field effect transistor 116 has its source-drain path connected between $Y_{12}$ and the noninverting input of operational amplifier 100, with its gate connected to $X_{12}$. Field effect transistor 118 has its source-drain path connected between $Y_{11}$ and the inverting input of operational amplifier 100, with its gate connected to $X_{11}$. Each set of four multiplication field effect transistors (such as field effect transistors 232, 234, 236 and 238) are similarly connected to corresponding differential voltage inputs.

Reference to the previous discussion of the output of operational amplifier 100 will indicate that the output voltage $V_O$ of the multiplier/summer circuit 400 is:

$$V_O = \frac{-1}{K_r(V_{c1} - V_{c2})} + \frac{1}{(W/L)_r(V_{c1} - V_{c2})} \sum_{i=1}^{n} (W/L)_i (X_{i1} - X_{i2})(Y_{i1} - Y_{i2})$$

This result requires that all the field effect transistors operate in the triode region. From the analysis above we note that this means that for each i:

$$Y_{i1}, Y_{i2} \leq \min[(X_{i1} - v_t), (X_{i2} - v_t)]$$

$$V_O \leq \min[(V_{c1} - v_t), (V_{c2} - v_t)]$$

This realization of the multiplier/summer circuit illustrated in FIG. 4 can be used with any of the selections noted above for simplification of the four quadrant multiplier function.

We claim:

1. An analog multiplier/summer circuit for providing an output voltage proportional to sum of the respective products of a plurality of sets of a first multiplicand voltage and a second multiplicand voltage comprising:

an operational amplifier having an inverting input, a noninverting input and an output, said output of said operational amplifier producing an output voltage being the output of the multiplier/summer circuit;

a first resistance having a predetermined resistance value connected between said inverting input of said operational amplifier and said output of said operational amplifier;

a second resistance having said predetermined resistance value connected between said noninverting input and a predetermined reference voltage;

a plurality of sets of depletion mode multiplication field effect transistors, each set including a first multiplication field effect transistor having a source-drain path connected between the corresponding first multiplicand voltage and the inverting input of said operational amplifier, and a gate connected to said predetermined reference voltage, a second multiplication field effect transistor having a source-drain path connected between the negative of the corresponding first multiplicand voltage and the inverting input of said operational amplifier, and a gate connected to the corresponding second multiplicand voltage, a third multiplication field effect transistor having a source-drain path connected between the negative of the corresponding first multiplicand voltage and the noninverting input of said operational amplifier, and a gate connected to the said predetermined reference voltage, a fourth multiplication field effect transistor having a source-drain path connected between the corresponding first multiplicand voltage and the noninverting input of said operational amplifier, and a gate connected to the corresponding second multiplicand voltage;

said first and second multiplicand voltages of each set are restricted such that said first multiplicand voltage is less than or equal to the minimum of the difference between said second multiplicand voltage and the threshold voltage of said first, second, third and fourth multiplication field effect transistors of that set and the negative of the threshold voltage of said first, second, third and fourth multiplication field effect transistors of that set; and a double inverter circuit having an input connected to the output of said operational amplifier and an output, said double inverter consisting of two CMOS field effect transistor inverter circuits disposed in tandem.

2. A neural network comprising:
a plurality of neuron circuits, each neuron circuit having
  an input terminal,
  an output terminal,
  an operational amplifier having an inverting input connected to said input terminal, a noninverting input and an output connected to said output terminal,
  a first resistance having a predetermined resistance value connected between said inverting input of said operational amplifier and said output of said operational amplifier,
  a second resistance having said predetermined resistance value connected between said noninverting input and a predetermined reference voltage,
  a plurality of synaptic weight input terminals equal in number to the number of said neuron circuits, each synaptic weight input terminal having a predetermined synaptic weight voltage thereon,
  a plurality of negative synaptic weight input terminals equal in number to the number of said synaptic weight input terminals, each negative synaptic weight input terminal having a voltage thereon which is the negative of said predetermined synaptic weight voltage on a corresponding synaptic weight input terminal,
  a plurality of feedback input terminals equal in number to the number of said neuron circuits, each feedback input terminal connected to the output terminal of a corresponding neuron circuit,
  a plurality of sets of depletion mode multiplication field effect transistors equal in number to the number of said neuron circuits, each set of depletion mode multiplication field effect transistors consisting of
    a first multiplication field effect transistor having a source-drain path connected between a corresponding synaptic weight input terminal and the inverting input of said operational amplifier, and a gate connected to said predetermined reference voltage,
    a second multiplication field effect transistor having a source-drain path connected between a corresponding negative synaptic weight input terminal and the inverting input of said operational amplifier, and a gate connected to a corresponding feedback input terminal,
    a third multiplication field effect transistor having a source-drain path connected between said corresponding negative synaptic weight input terminal and the noninverting input of said operational amplifier, and a gate connected to said predetermined reference voltage, and
    a fourth multiplication field effect transistor having a source-drain path connected between said corresponding synaptic weight input terminal, and the noninverting input of said operational amplifier, and a gate connected to said corresponding feedback input terminal;
  said predetermined synaptic weight voltages applied to respective synaptic weight input terminals being restricted such that the absolute value of said predetermined synaptic weight voltage is less than or equal to the negative of the threshold voltage of said first, second, third and fourth multiplication field effect transistors if the voltage on said output terminal of said corresponding neuron circuit is greater than zero and the absolute value of the predetermined synaptic weight voltage is less than or equal to the difference between said voltage on said output terminal of said corresponding neuron circuit and the threshold voltage of said first, second, third and fourth multiplication field effect transistors if said voltage on said output terminal of said corresponding neuron circuit is less than zero;
  an interconnection means for connecting the output terminal of each neuron circuit to a corresponding feedback input terminal of each input circuit; and
  each neuron circuit further including a double inverter circuit having an input connected to the output of said operational amplifier and an output, consisting of two field effect transistor inverter circuits disposed in tandem.

3. A multiplier/summer circuit for providing an output voltage proportional to sum of the respective products of a plurality of sets of the difference between a first differential voltage and a second differential voltage and the difference between a third differential voltage and a fourth differential voltage comprising:
  an operational amplifier having an inverting input, a noninverting input and an output, said output of said operational amplifier producing an output voltage being the output of the multiplier/summer circuit;
  a first resistance having a predetermined resistance value connected between said inverting input of said operational amplifier and said output of said operational amplifier;
  a second resistance having said predetermined resistance value connected between said noninverting input and a predetermined reference voltage;
  a plurality of sets of depletion mode multiplication field effect transistors, each set including
    a first multiplication field effect transistor having a source-drain path connected between the corresponding first differential voltage and the inverting input of said operational amplifier, and a gate connected to said fourth differential voltage,
    a second multiplication field effect transistor having a source-drain path connected between the corresponding second differential voltage and the inverting input of said operational amplifier, and a gate connected to the corresponding third differential voltage,
    a third multiplication field effect transistor having a source-drain path connected between the corresponding second differential voltage and the noninverting input of said operational amplifier, and a gate connected to the said fourth differential voltage,
    a fourth multiplication field effect transistor having a source-drain path connected between the corresponding first differential voltage and the noninverting input of said operational amplifier, and a gate connected to the corresponding third differential voltage;
  said first, second, third and fourth differential voltages of each set are restricted such that each of the first differential voltage and the second differential voltage is less than or equal to the minimum of the difference between the third difference voltage and the threshold voltage of said first, second, third and fourth multiplication field effect transistors of that set and the difference between the fourth differential voltage and the threshold voltage of said first, second, third and fourth multiplication field effect transistors of that set;

said first, second, third and fourth multiplication field effect transistors of each set are constructed of identical field effect devices having identical carrier mobility to that of every other set, having identical oxide capacitance per unit area to that of every other set, and having the identical ratio of gate width to gate length;

said first and second resistances consist of
- a first resistance field effect transistor having a source-drain path connected between the inverting input of said operational amplifier and the output of said operational amplifier, and a gate connected to a first resistance control voltage,
- a second resistance field effect transistor having a source-drain path connected between the inverting input of said operational amplifier and said predetermined reference voltage, and a gate connected to a second resistance control voltage,
- a third resistance field effect transistor having a source-drain path connected between the noninverting input of said operational amplifier and the output of said operational amplifier, and a gate connected to said second resistance control voltage, and
- a fourth resistance field effect transistor having a source-drain path connected between the noninverting input of said operational amplifier and said predetermined reference voltage, and a gate connected to said first resistance control voltage; and said first, second, third and fourth resistance field effect transistors of each set are constructed of identical field effect devices having identical carrier mobility to that of every other set and equal to said carrier mobility of said first, second, third and fourth multiplication field effect transistors, having identical oxide capacitance per unit area to that of every other set and equal to said oxide capacitance per unit area of said first, second, third and fourth multiplication field effect transistors, and having the identical ratio of gate width to gate length to that of every other set that differs from the ratio of gate width to length of said first, second, third and fourth multiplication field effect transistors.

4. An analog multiplier/summer circuit for providing an output voltage proportional to sum of the respective products of a plurality of sets of a first multiplicand voltage and a second multiplicand voltage comprising:
- an operational amplifier having an inverting input, a noninverting input and an output, said output of said operational amplifier producing an output voltage being the output of the multiplier/summer circuit;
- a first resistance having a predetermined resistance value connected between said inverting input of said operational amplifier and said output of said operational amplifier;
- a second resistance having said predetermined resistance value connected between said noninverting input and a predetermined reference voltage;
- a plurality of sets of depletion mode multiplication field effect transistors, each set including
  - a first multiplication field effect transistor having a source-drain path connected between the corresponding first multiplicand voltage and the inverting input of said operational amplifier, and a gate connected to said predetermined reference voltage,
  - a second multiplication field effect transistor having a source-drain path connected between the negative of the corresponding first multiplicand voltage and the inverting input of said operational amplifier, and a gate connected to the corresponding second multiplicand voltage,
  - a third multiplication field effect transistor having a source-drain path connected between the negative of the corresponding first multiplicand voltage and the noninverting input of said operational amplifier, and a gate connected to the said predetermined reference voltage,
  - a fourth multiplication field effect transistor having a source-drain path connected between the corresponding first multiplicand voltage and the noninverting input of said operational amplifier, and a gate connected to the corresponding second multiplicand voltage;

said first and second multiplicand voltages of each set are restricted such that said first multiplicand voltage is less than or equal to the minimum of the difference between said second multiplicand voltage and the threshold voltage of said first, second, third and fourth multiplication field effect transistors of that set and the negative of the threshold voltage of said first, second, third and fourth multiplication field effect transistors of that set;

said first, second, third and fourth multiplication field effect transistors of each set are constructed of identical field effect devices having identical carrier mobility to that of every other set, having identical oxide capacitance per unit area to that of every other set, and having the identical ratio of gate width to gate length;

said first and second resistances consist of
- a first resistance field effect transistor having a source-drain path connected between the inverting input of said operational amplifier and the output of said operational amplifier, and a gate connected to a first resistance control voltage,
- a second resistance field effect transistor having a source-drain path connected between the inverting input of said operational amplifier and said predetermined reference voltage, and a gate connected to a second resistance control voltage,
- a third resistance field effect transistor having a source-drain path connected between the noninverting input of said operational amplifier and the output of said operational amplifier, and a gate connected to said second resistance control voltage, and
- a fourth resistance field effect transistor having a source-drain path connected between the noninverting input of said operational amplifier and said predetermined reference voltage, and a gate connected to said first resistance control voltage; and said first, second, third and fourth resistance field effect transistors of each set are constructed of identical field effect devices having identical carrier mobility to that of every other set and equal to said carrier mobility of said first, second, third and fourth multiplication field effect transistors, having identical oxide capacitance per unit area to that of every other set and equal to said oxide capacitance per unit area of said first, second, third and fourth multiplication field effect transistors, and having the identical ratio of gate width to gate length to that of every other set that differs from the ratio of gate width to length to said first, second, third and fourth multiplication field effect transistors.

5. A neural network comprising:
a plurality of neuron circuits, each neuron circuit having
   an input terminal,
   an output terminal,
   an operational amplifier having an inverting input connected to said input terminal, a noninverting input and an output connected to said output terminal,
   a first resistance having a predetermined resistance value connected between said inverting input of said operational amplifier and said output of said operational amplifier,
   a second resistance having said predetermined resistance value connected between said noninverting input and a predetermined reference voltage,
   a plurality of synaptic weight input terminals equal in number to the number of said neuron circuits, each synaptic weight input terminal having a predetermined synaptic weight voltage thereon,
   a plurality of negative synaptic weight input terminals equal in number to the number of said synaptic weight input terminals, each negative synaptic weight input terminal having a voltage thereon which is the negative of said predetermined synaptic weight voltage on a corresponding synaptic weight input terminal,
   a plurality of feedback input terminals equal in number to the number of said neuron circuits, each feedback input terminal connected to the output terminal of a corresponding neuron circuit,
   a plurality of sets of depletion mode multiplication field effect transistors equal in number to the number of said neuron circuits, each set of the depletion mode multiplication field effect transistors consisting of
   a first multiplication field effect transistor having a source-drain path connected between a corresponding synaptic weight input terminal and the inverting input of said operational amplifier, and a gate connected to said predetermined reference voltage,
   a second multiplication field effect transistor having a source-drain path connected between a corresponding negative synaptic weight input terminal and the inverting input of said operational amplifier, and a gate connected to a corresponding feedback input terminal,
   a third multiplication field effect transistor having a source-drain path connected between said corresponding negative synaptic weight input terminal and the noninverting input of said operational amplifier, and a gate connected to said predetermined reference voltage, and
   a fourth multiplication field effect transistor having a source-drain path connected between said corresponding synaptic weight input terminal, and the noninverting input of said operational amplifier, and a gate connected to said corresponding feedback input terminal;
said predetermined synaptic weight voltages applied to respective synaptic weight input terminals being restricted such that the absolute value of said predetermined synaptic weight voltage is less than or equal to the negative of the threshold voltage of said first, second, third and fourth multiplication field effect transistors if the voltage on said output terminal of said corresponding neuron circuit is greater than zero and the absolute value of the predetermined synaptic weight voltage is less than or equal to the difference between said voltage on said output terminal of said corresponding neuron circuit and the threshold voltage of said first, second, third and fourth multiplication field effect transistors if said voltage on said output terminal of said corresponding neuron circuit is less than zero;
an interconnection means for connecting the output terminal of each neuron circuit to a corresponding feedback input terminal of each neuron circuit;
said first and second resistances of each neuron circuit consist of
   a first resistance field effect transistor having a source-drain path connected between the inverting input of said operational amplifier and the output of said operational amplifier, and a gate connected to a first resistance control voltage,
   a second resistance field effect transistor having a source-drain path connected between the inverting input of said operational amplifier and said predetermined reference voltage, and a gate connected to a second resistance control voltage,
   a third resistance field effect transistor having a source-drain path connected between the noninverting input of said operational amplifier and the output of said operational amplifier, and a gate connected to said second resistance control voltage, and
   a fourth resistance field effect transistor having a source-drain path connected between the noninverting input of said operational amplifier and said predetermined reference voltage, and a gate connected to said first resistance control voltage;
said first, second, third and fourth resistance field effect transistors are constructed having identical carrier mobility equal to said carrier mobility of said first, second, third and fourth multiplication field effect transistors, and having identical oxide capacitance per unit area to said oxide capacitance per unit area of said first, second, third and fourth multiplication field effect transistors, and having the identical ratio of gate width to gate length;
said first and second resistance control voltages are restricted relative to the voltage on said output terminal of said corresponding neuron circuit such that the voltage on said output terminal of said corresponding neuron circuit is less than or equal to the minimum of the difference between the first resistance control voltage and the threshold voltage of said first, second, third and fourth resistance field effect transistors and the difference between the second resistance control voltage and the threshold voltage of said first, second, third and fourth resistance field effect transistors; and
said first, second, third and fourth multiplication field effect transistors of each set are constructed of identical field effect devices having identical carrier mobility of that of every other set and equal to said carrier mobility of said first, second, third and fourth resistance field effect transistors, having identical oxide capacitance per unit area to that of every other set and equal to said oxide capacitance per unit area of said first, second, third and fourth resistance field effect transistors, and having the identical ratio of gate width to gate length to that of every other set that differs from the ratio of gate width to length of said first, second, third and fourth resistance field effect transistors.

* * * * *

UNITED STATES PATENT AND TRADEMARK OFFICE
CERTIFICATE OF CORRECTION

PATENT NO. : 5,305,250
DATED : April 19, 1994
INVENTOR(S) : Fathi M. A. Salam and Mohammed I. El-Naggar It is certified that error appears in the above—identified patent and that said Letters Patent is hereby corrected as shown below:

Column 3, line 27, "weight" should be --weights--.

Column 3, line 45, "internaltinal" should be --International--.

Column 3, line 66, "discribed" should be --described--.

Column 5, line 63, after "to" and before "terminals", the following should be inserted --both input--.

Column 7, lines 26, 45, 49, and 54, " $\leqq$ " should be -- $\leq$ -- in each instance.

Column 9, lines 9, 62, 63, and 67, "$\leqq$" should be --$\leq$--.

Column 12, lines 5 and 7, "$\leqq$" should be --$\leq$--.

Column 15, line 42, Claim 3, "multiplication" should be --resistance--.

UNITED STATES PATENT AND TRADEMARK OFFICE
CERTIFICATE OF CORRECTION

PATENT NO. : 5,305,250
DATED : April 19, 1994
INVENTOR(S) : Fathi M. A. Salam, et. al.

It is certified that error appears in the above-indentified patent and that said Letters Patent is hereby corrected as shown below:

Column 17, line Claim 4, "multiplication" should be --resistance--.

Signed and Sealed this

Eleventh Day of October, 1994

*Attest:*

BRUCE LEHMAN

*Attesting Officer*     *Commissioner of Patents and Trademarks*